UNITED STATES PATENT OFFICE.

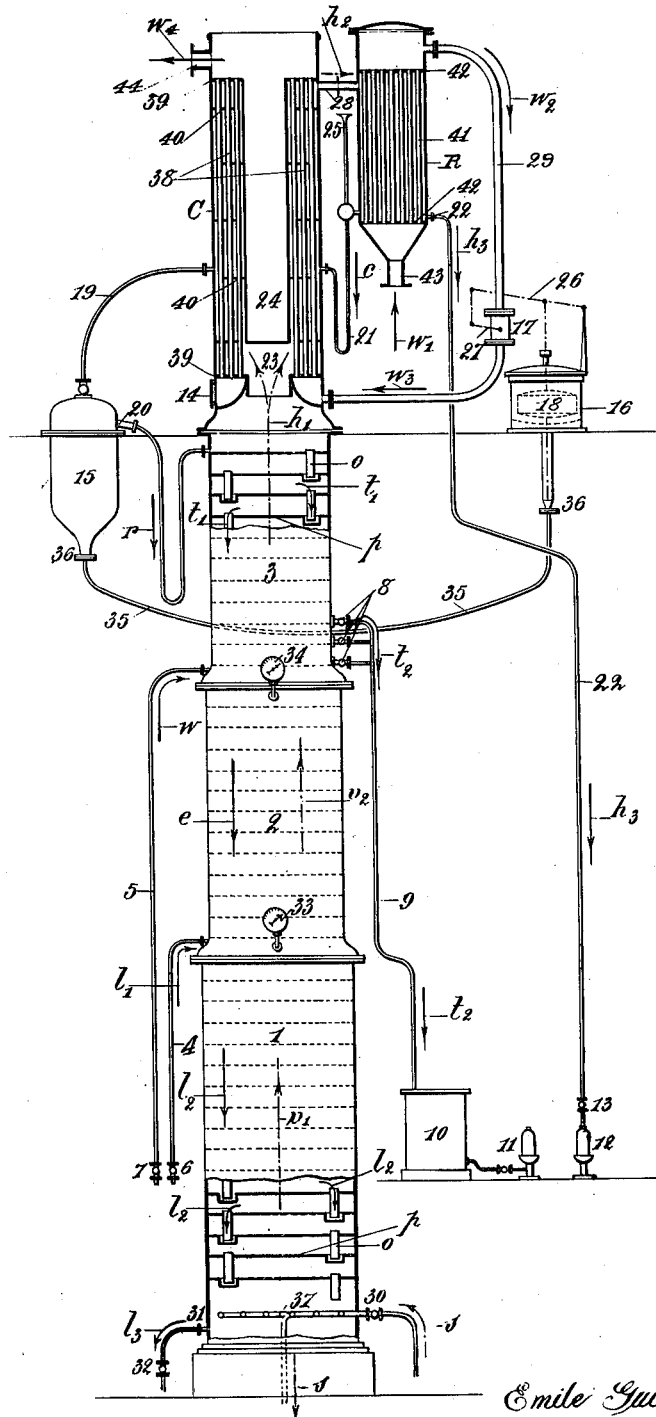

EMILE GUILLAUME, OF PARIS, FRANCE.

PROCESS FOR THE DISTILLATION OF ALCOHOLIC LIQUIDS.

996,328.

Specification of Letters Patent. Patented June 27, 1911.

Application filed March 26, 1902. Serial No. 100,033.

*To all whom it may concern:*

Be it known that I, EMILE GUILLAUME, a citizen of the French Republic, residing at Paris, France, have invented Improvements in Processes for the Distillation of Alcoholic Liquids, of which the following is such a full and clear description as will enable others skilled in the art to make and use the same, this invention having been patented in France September 9, 1901, No. 314,129.

My invention relates particularly to a process for separating from crude distillates the ethyl alcohol therein contained, and simultaneously removing from the mixture the so-called "head" and "tail" products. By head products are meant those impurities having a lower boiling point than ethyl alcohol; by tail products, those whose boiling point is higher than that of ethyl alcohol. Under "head" products may be included the aldehydes, ethers, and the like, while "tail" products embrace such impurities as amyl alcohol, isoamyl acetate, isovalerate of ethyl, etc.

My process is based upon the fact that when a liquid alcoholic mixture containing ethyl alcohol and impurities having a higher boiling point than ethyl alcohol is sufficiently diluted with water, the ethyl alcohol may be separated by distilling off said impurities and be recovered practically pure, diluted only with water. For example, take a mixture which contains ethyl alcohol (boiling point 78° C.), and amyl alcohol (boiling point 132° C.) and dilute with water until mixture marks 13.7° on the Baumé hydrometer. When this point is reached the amyl alcohol will be vaporized 2.5 times more rapidly than the ethyl alcohol and the ratio of amyl alcohol to ethyl alcohol in the distillation vapors will be 2.5 times that in the liquid mixture. In other words, the addition of the proper amount of water has caused the ethyl alcohol to act like a tail product as regards the amyl alcohol.

With my present process I have found in practice, that when treating crude distillates, in order to obtain a complete separation of the ethyl alcohol constituent, the liquids should be diluted with water until they mark 13.7 to 14.3 Baumé, and should be maintained at this degree of dilution.

In the annexed drawings I have shown, as an example, an apparatus for carrying out my process, which on a proper scale will be sufficient to allow a production of 6500 liters calculated as absolute alcohol daily. Of course, the size and details would be varied to meet local conditions and requirements, but this apparatus will carry out my process perfectly.

In the drawings 1, 2 and 3 indicate superposed communicating distilling columns, provided with shelves consisting of perforated plates $p$ having a suitable overflow pipe $o$. In the illustration chosen the column 1 has a height of approximately 2.5 unm, a diameter of 800 mm., and contains 14 plates; column 2 is 1.8 meters high, 750 mm. in diameter and has 11 plates; column 3 has 11 plates, is 1.8 meters high, and its diameter is 650 mm. At the base of column 1 steam enters, in the direction of the arrow $s$, into the coil 37.

31 is the outlet, controlled by cock 32. Arrows $1_1$, $1_2$, $1_3$ indicate direction of flow of liquids into and in column 1, $e$ the direction of liquids in column 2, and $t_1$, $t_2$, flow of liquids in and out of column 3. The direction of vapors in the columns is marked by arrows $v_1$, $v_2$, $h_1$, $h_2$, while $h_3$ indicates the flows of the condensed head products. At the top of column 1 is the inlet pipe 4, controlled by the cock 6, and into the top of column 2 enters the pipe 5, provided with cock 7, $w$ indicating the direction of flow. Above column 2 is column 3, opening through 23 into the condenser C, which in turn, through pipe 28, is connected with the refrigerator R, provided with pipes 41 fastened to bases 42. The condenser C is built up of pipes 38 fastened between bases 39, and supported by perforated plates 40.

24 is a closed pipe against which the vapors coming through the passage 23 impinge and are distributed among the cooling pipes 38.

14 is a cleaning plug hole, and 44 the outlet of condenser C.

43 is the inlet for water to refrigerator R. 25 is a vent-pipe and 21 a return pipe from the base of R, in the direction of $c$, to a point above the base of condenser C.

22 is a pipe connecting the base of R with the sampling tube 12. A discharge pipe 9, furnished with a plurality of tap-cocks 8, connects the base of column 3 with the refrigerator 10 and the sampling tube 11. The The condensing water enters at 43 and leaves the refrigerator through the pipe 29, passing to the condenser C, the flow being indicated by the arrows $w_1$, $w_2$, $w_3$ and $w_4$. For automatically controlling the flow of water through the condensers, there is inserted in the pipe 29 a regulating valve 17 actuated by a float 18, contained in box 16, through a series of levers 26, 27. A water container 15 having at its top a pipe 19 connecting with the condenser C, and an overflow pipe 20 emptying into the top of column 3, is joined to the float box 16 by a pipe 35. A diaphragm, perforated with a very small hole, interposed in one of the pipe connections 36 retards sufficiently the flow between the vessels 15 and 16 and avoids shocks. Should the pressure change in the condenser chamber C, such variation is transmitted through pipe 19, container 15, pipe 35, float 18 to valve 17 and the water supply is thus regulated.

The operation of the process is as follows: The apparatus is first heated and maintained heated by the steam pipe 30 at a temperature (*circa* 96°–97° C.) sufficient to separate the alcohol from the liquid that enters the column 1. The liquid to be treated, consisting of ethyl alcohol, head products and tail products, having been previously diluted to mark 13.7 to 14.3 Baumé, is introduced by the pipe 4 into the top of column 1. The liquid thus introduced has a temperature of approximately 60° C. While the diluted liquid is flowing down over the plates of column 1, the head products, the tail products and some of the ethyl alcohol are vaporized and pass upward into column 2, while the unvaporized diluted ethyl alcohol falls to the bottom of column 1, and is drawn off through pipe 31, provided with valve 32. The ascending head products, tail products, and the ethyl alcohol therewith entrained are met, as they ascend in column 2, by a mass of hot water, low wines or similar liquid, introduced into the top of column 2, through the pipe 5. This dilutes the ascending vapors, and is added in sufficient amount to maintain the dilution, in column 2 at 13.3° to 14.7° Baumé, the specific gravity at which the head and tail products will distil off from what ethyl alcohol there may be still carried along in column 2 by the head and tail products. As the amount of dilution is dependent upon the temperature, and in order to enable the operator to maintain an approximately uniform dilution in column 2, thermometers 33 and 34 (of any construction) are provided at the bottom and at the top of column 2, and during the operation the readings of these thermometers must be kept approximately equal. When these thermometers read 96° to 97° C., the operator knows that the density of the liquids is at 13.7 to 14.3 Baumé and that the ethyl alcohol will act in relation to the head and tail products in the vapors, as a tail product. The vapors rising in columns 1 and 2, meet the entering water. The ethyl alcohol has great affinity for it, and being readily soluble therein unites with the water and finally reaches the bottom of column 1, while the tail products being insoluble in water pass through it and upward into column 3. The head products are soluble in water, but their boiling points being so much lower than the water vapor, and their vapor tension being so much greater, they also pass through the water with the tail products and up into column 3. In column 3 the vapors consist of tail products, amyl alcohol, and other head products such as aldehydes, ethers and the like. In column 3 no dilution takes place, and the tail products after being condensed on the shelves of column 3, run down to the base thereof, and are drawn off through a pipe 9 to a refrigerator 10 and to testing apparatus 11 where the workman ascertains that head and tail products are passing off, and thence to casks, or vats. The tail products drawn off mark 39° to 40° Baumé. The head products pass from column 3 into the base of condenser C, and thence through pipe 18 to another condenser or refrigerator R, where they are mostly condensed, and drawn off by pipe $h^3$, controlled by the cock 13. In the testing apparatus 12 the head products mark 42°–43° Baumé. Any tail products that might be carried along up into condenser C, become there condensed and fall back onto the shelves of column 3, while the head products condensed in R and not extracted through $h^3$ pass back into condenser C through pipe 21, whereas the non-condensable gases, for example, $CO_2$, escapes into the open air through the open pipe 25. The temperature in condenser C is approximately 78° C., but, in order to work at its best, the condenser should be hot at the top and cold at the bottom. Any usual system of cooling may be used for the condenser, such as the automatic one illustrated in the drawing.

Having thus fully illustrated and described my invention, what I claim is:

1. The hereindescribed process of purifying alcoholic liquids which comprises diluting the same to form a liquid from which head products and tail products can be simultaneously distilled, directly introducing said liquid into a column still at a point above its base and distilling it to form vapors containing head products, tail products and a limited amount of ethyl alcohol, treating the vapors with a modicum of hot aqueous liquid to hold back said ethyl alcohol, collecting dilute purified alcohol at the base of the still and collecting head products and tail products near the top of the still.

2. The hereindescribed process of purifying alcoholic liquids which comprises diluting the same with water to form a liquid of between 13.7° and 14.7° Baumé, introducing the liquid into a column still at a point above its base and distilling it to form vapors containing tail products head products and a limited amount of ethyl alcohol, treating the vapors with a modicum of water to hold back said ethyl alcohol, collecting dilute purified alcohol at the base of the still and collecting head products and tail products near the top of the still.

3. The hereindescribed process of purifying alcoholic liquids which comprises diluting the same with water to form a liquid of between 13.7° and 14.7° Baumé, introducing the liquid into a column still at a point above its base and distilling it to form vapors containing tail products head products and a limited amount of ethyl alcohol, treating the vapors with a modicum of hot water to hold back said ethyl alcohol, collecting dilute purified alcohol at the base of the still and collecting head products and tail products near the top of the still.

In witness whereof I have hereunto set my hand in the presence of two witnesses.

EMILE GUILLAUME.

Witnesses:
EDWARD P. MACLEAN,
JULES FAYOLLET.